United States Patent [19]
Rodriguez et al.

[11] Patent Number: 5,653,951
[45] Date of Patent: Aug. 5, 1997

[54] STORAGE OF HYDROGEN IN LAYERED NANOSTRUCTURES

[75] Inventors: Nelly M. Rodriguez; R. Terry K. Baker, both of State College, Pa.

[73] Assignee: Catalytic Materials Limited, Mansfield, Mass.

[21] Appl. No.: 437,136

[22] Filed: May 5, 1995

Related U.S. Application Data

[63] Continuation-in-part of Ser. No. 374,033, Jan. 17, 1995, Pat. No. 5,458,784.
[51] Int. Cl.⁶ .................. C01B 3/02; C01B 6/00; C01B 31/30; D01F 9/12
[52] U.S. Cl. .................. 423/439; 206/0.7; 423/447.2; 423/645; 423/648.1
[58] Field of Search .............. 206/0.7; 423/645, 423/648.1, 439

[56] References Cited

U.S. PATENT DOCUMENTS

| | | | |
|---|---|---|---|
| 4,663,230 | 5/1987 | Tennent | 428/367 |
| 5,149,584 | 9/1992 | Baker et al. | 428/297 |
| 5,165,909 | 11/1992 | Tennent et al. | 423/447.3 |
| 5,385,876 | 1/1995 | Schwarz et al. | 206/0.7 |
| 5,458,784 | 10/1995 | Baker et al. | 210/674 |

*Primary Examiner*—Wayne Langel

[57] ABSTRACT

The present invention relates to the storage of hydrogen in layered nanostructures possessing: at least some crystallinity, interstices from about 0.335 nm to 0.67 nm, and chemisorption properties with respect to hydrogen at those surfaces of the nanostructure which define the interstices. Preferred layered nanostructures are carbon nanostructures such as those selected from carbon nanotubes, carbon fibrils, carbon nanoshells, and carbon nanofibers. Hydrogen is chemisorbed into the interstices of the nanostructures.

41 Claims, 3 Drawing Sheets

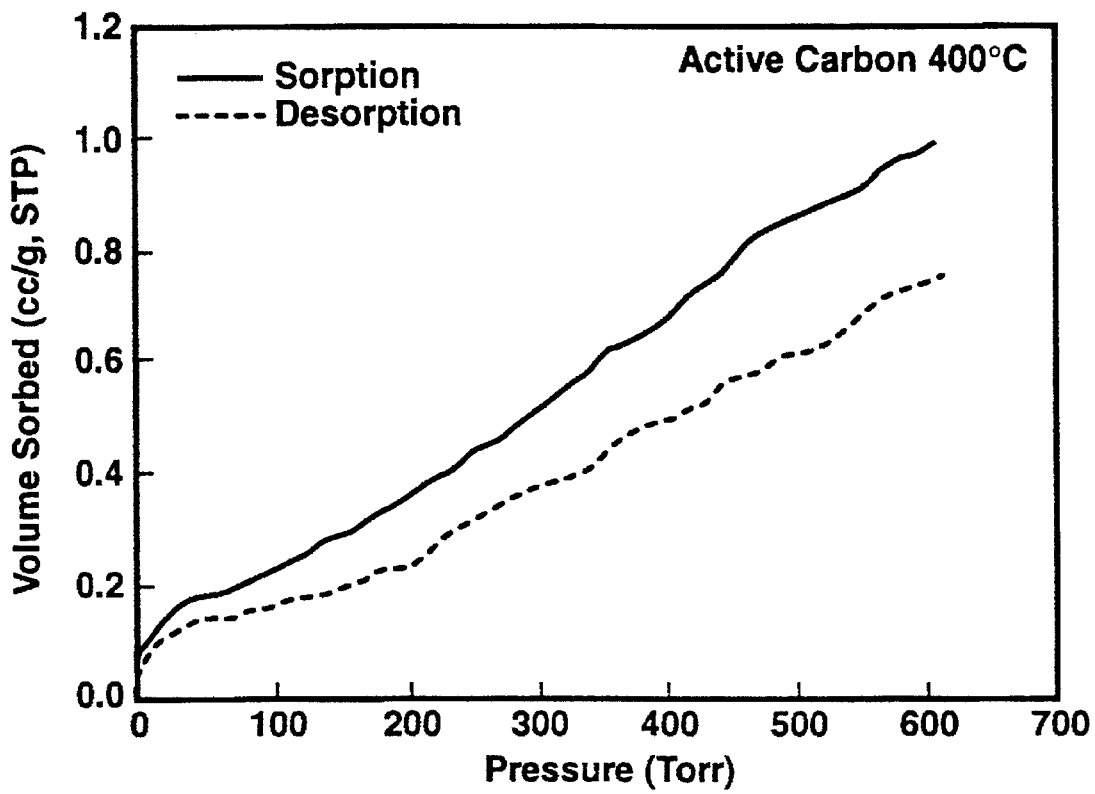
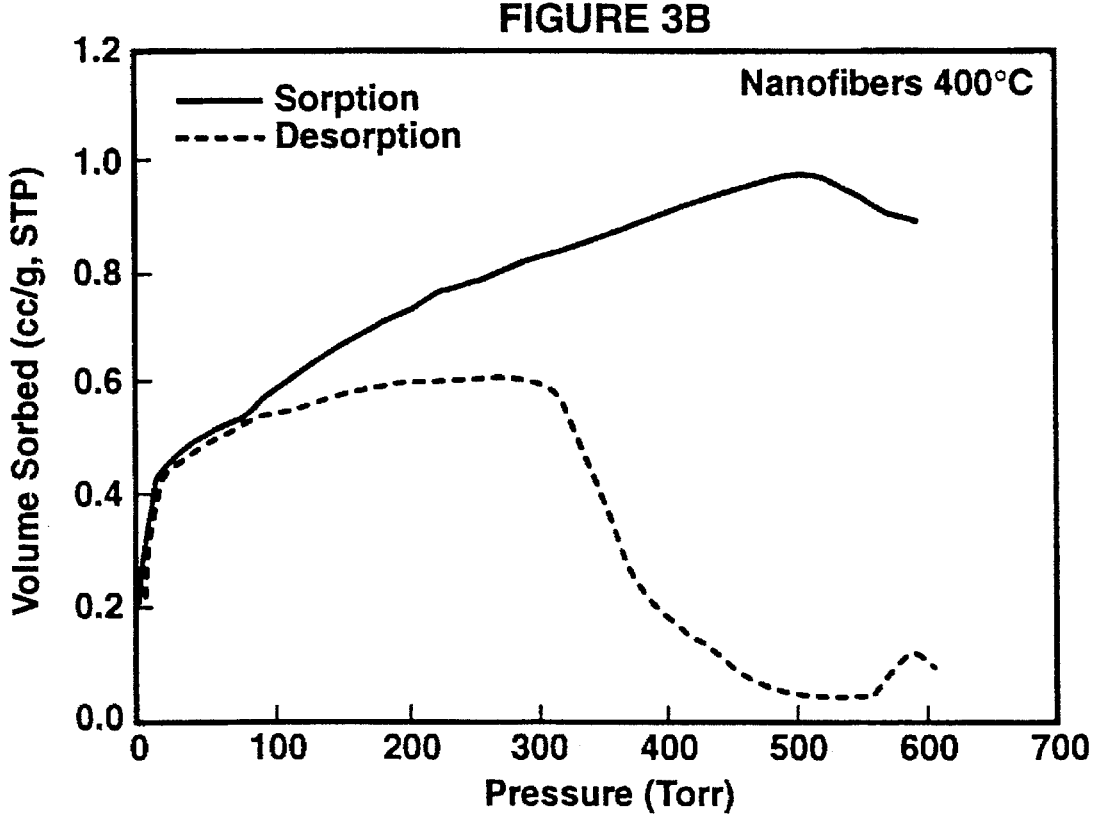

STORAGE OF HYDROGEN IN LAYERED NANOSTRUCTURES

CROSS REFERENCE TO RELATED APPLICATIONS

This is a continuation in part of U.S. Ser. No. 08/374,033; filed Jan. 17, 1995; now U.S. Pat. No. 5,458,784.

FIELD OF THE INVENTION

The present invention relates to the storage of hydrogen in layered nanostructures possessing: at least some crystallinity, interstices from about 0.335 nm to 0.67 nm, and chemisorption properties with respect to hydrogen at those surfaces of the nanostructure which define the interstices. Preferred layered nanostructures are carbon nanostructures such as those selected from carbon nanotubes, carbon fibrils, carbon nanoshells, and carbon nanofibers. Hydrogen is chemisorbed into the interstices of the nanostructures.

BACKGROUND OF THE INVENTION

Various technologies are being developed to replace the gasoline-powered internal combustion engine. One reason for this is the fact that within the foreseeable future, petroleum reserves will be depleted. Another reason for this is that because ever stricter environmental regulations are putting great pressure on energy companies and automobile manufacturers to develop cleaner burning fuels and cleaner running vehicles. For example, the conventional internal combustion engine produces pollutants such as particulates, nitrogen oxides, sulfur oxides, hydrocarbons and carbon monoxide. While various alternative fuel technologies have been proposed and are the subject of a substantial amount of research and development, the hydrogen powered fuel cell is thought to be ideal alternative to fossil fuel systems. The primary reason for this is because hydrogen, which is derived from all kinds of renewable energies, is the only energy carrier which can be used without any environmental damage. The production of energy from hydroenergy (energy from hydrogen) and solar energy and its conversion into electrical and thermal energy with a fuel cell presents a process cycle, which can be repeated without limits, producing no ecological harmful side products.

The failure to produce a practical storage system for hydrogen has prevented hydrogen from coming to the commercial forefront as a transportation fuel. The ideal hydrogen storage system needs to be light, compact, relatively inexpensive, safe, easy to use, and reusable without the need for regeneration. While research and development is continuing on such technologies as: liquid hydrogen systems, compressed hydrogen systems, metal hydride systems, and super activated carbon systems, all of these systems have serious disadvantages. For example, liquid hydrogen systems are very expensive, primarily because the hydrogen must be cooled to about $-252°$ C. For example, a liquid hydrogen system will cost about four times more than an equivalent mount of gasoline. Further, liquid hydrogen must be kept cold to prevent it from boiling away, even when the vehicle is parked. Compressed hydrogen is much cheaper than liquid hydrogen, but it is much bulkier. Even at 6,000 psig, tanks of compressed hydrogen, which would be capable of supplying enough fuel for a standard family automobile to cover about 350 miles, would take up about 4 to 5 times as much space as a conventional gasoline tank. Also, a tank of compressed hydrogen is not only very dangerous, but it will be excessively heavy and expensive for the average all purpose family vehicle.

Metal hydride systems store hydrogen as a solid in combination with other materials. For example, metal hydrides are produced by bathing a metal, such as palladium or magnesium, in hydrogen. The metal splits the two-atom hydrogen gas molecules and binds the hydrogen atoms to the metal until released by heating. The disadvantages of a metal hydride system are: (i) metal halides typically weigh about 8 times more than an equivalent amount of liquid hydrogen, or an equivalent amount of gasoline; and (ii) they must be heated to relatively high temperatures before they give up hydrogen.

Superactivated carbon is the basis of another system for storing hydrogen which initially showed commercial potential. Super activated carbon is a material similar to the highly porous activated carbon used in water filters, but which can gently hold hydrogen molecules by physisorption at subzero temperatures. The colder the carbon, the less heat that is needed to disturb the weak forces holding the carbon and hydrogen together. Again, a major disadvantage of such a system is that in order to prevent the hydrogen from escaping the system must constantly be kept at very low temperatures, even when the vehicle is parked.

Technology is also being developed wherein hydrogen is liberated from the reaction of powdered iron and water. When the driver presses on the gas pedal, a burst of steam sprays over a bed of powdered iron, packed into long tubes. Hydrogen gas immediately forms and is injected into a fuel cell, which will then generate a current for an electric motor. The resulting oxidized iron, or rust, will remain behind. A major disadvantage of such a system is that the system must be heated to several hundred degrees before the hydrogen-producing reaction can occur and the resulting metal oxide must be regenerated or replaced.

Consequently, there still remains a great need in the art for a material which can store hydrogen and which is light, compact, relatively inexpensive, safe, easy to use, and reusable without regeneration.

SUMMARY OF THE INVENTION

In accordance with the present invention, there is provided a composition comprised of:

(a) a layered nanostructure having; (i) at least some regions of crystallinity, (ii) interstices within said crystalline regions which interstices are from about 0.335 nm to 0.67 nm, and (iii) surfaces of said nanostructure which define said interstices, which surfaces have chemisorption properties with respect to hydrogen; and (b) hydrogen stored within said interstices.

In preferred embodiments of the present invention, the layered nanostructure is a carbon nanostructure selected from the group consisting of carbon nanotubes, carbon fibrils, carbon nanoshells, and carbon nanofibers.

In still other preferred embodiments of the present invention, the carbon nanostructures are characterized as having: (i) a surface area from about 0.2 to 3,000 $m^2/g$ as determined by $N_2$ adsorption at $-196°$ C., (ii) a crystallinity from about 5% to 100%, and (iii) interstices of about 0.335 nm to 0.67 nm.

In yet other preferred embodiments of the present invention, the carbon nanostructures are carbon nanofibers characterized as having: (i) a surface area from about 50 to 800 $m^2/g$; (ii) a crystallinity from about 50% to 100%; and (iii) a distance between graphite platelets of about 0.335 nm to about 0.67 nm.

BRIEF DESCRIPTION OF THE FIGURES

FIGS. 3A and 3B are isotherms showing the sorption and desorption behavior of active carbon and carbon nanofibers of the present invention after exposure to hydrogen at 400° C.

DETAILED DESCRIPTION OF THE INVENTION

Figure 1A:
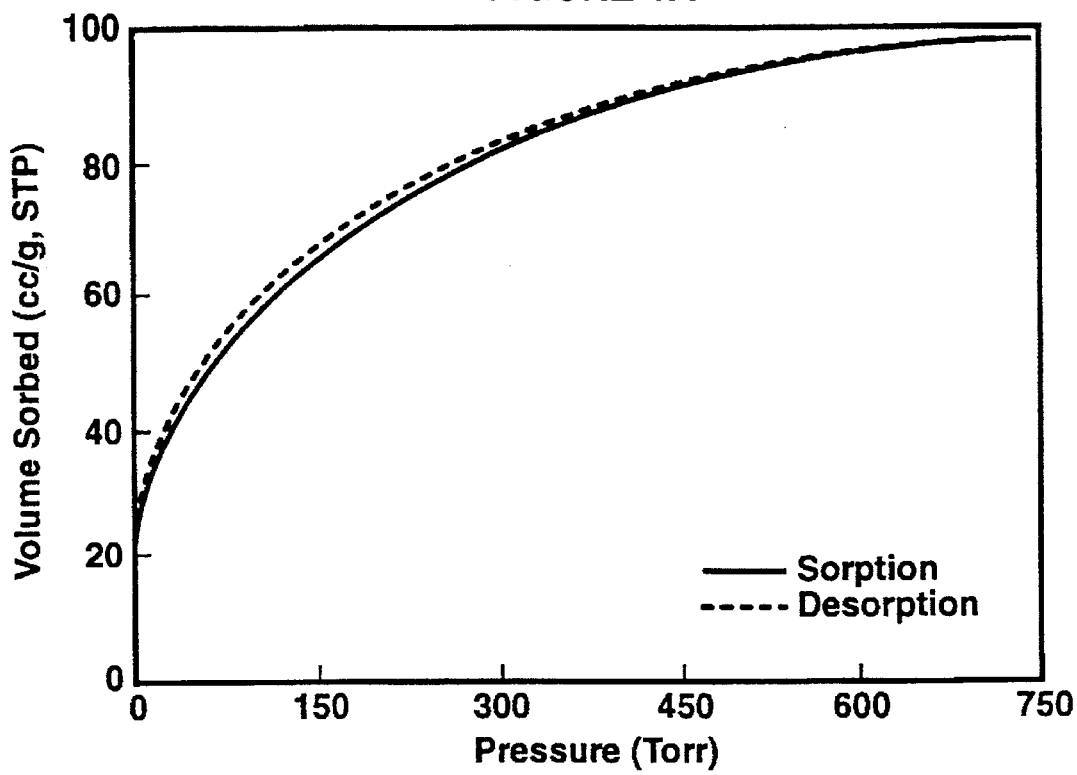
FIGS. 1A and 1B are isotherms showing the sorption and desorption behavior of active carbon and carbon nanofibers of the present invention respectively after exposure to hydrogen at −196° C. The plot is Pressure in Torr vs. Volume Sorbed, (cc/g standard temperature and pressure (STP)).
Figure 1B:
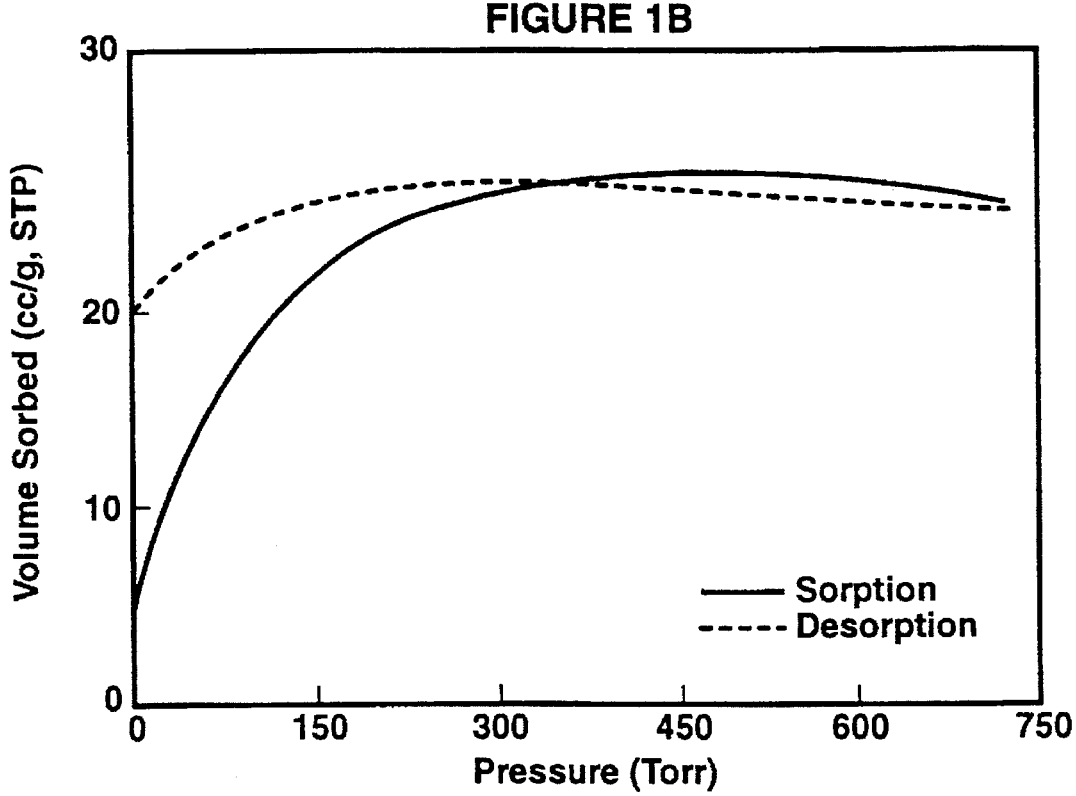

The layered nanostructures of the present invention, which are preferalby inorganic, and which are used to store hydrogen can be any suitable structure having: (i) a surface area from about 0.2 to 3,000 $m^2/g$, preferably from about 50 to 800 $m^2/g$, more preferably from about 100 to 700 $m^2/g$, and most preferably from about 250 to 350 $m^2/g$, which surface area is determined by $N_2$ adsorption at −196° C.; (ii) a crystallinity from about 5% to about 100%, preferably from about 50% to 100%, more preferably from about 75% to 100%, most preferably from about 90% to 100%, and ideally substantially 100%; (iii) interstices of about 0.335 nm to about 0.67 nm, preferably from about 0.335 nm to about 0.40 nm, and most preferably about 0.335 nm; and surfaces of said nanostructure which define said interstices, which surfaces have chemisorption properties with respect to hydrogen. The nanostructures used in the present invention can also have a diameter from about 0.75 nm to about 1,000 nm, preferably from about 0.75 nm to about 500 nm, and more preferably from about 0.75 nm to 200 nm. It is to be understood that "nm" means nanometer.

Such structures will absorb hydrogen into the interstices and will not release it in any great quantity until heated to an effective temperature. The most preferred layered nanostructures are carbon nanostructures. Although not wishing to be bound by theory, it is believed that the nanostructures of the present invention store hydrogen by chemisorbing molecular hydrogen in the interstices of the nanostructure. That is, by a non-dissociative mechanism, as opposed to a dissociative chemisorption method, like palladium hydrogen absorption wherein the hydrogen molecule is split and atomic hydrogen is held by palladium. It is most preferred that the nanostructures of the present invention be substantially ordered. That is, that they be substantially entirely graphitic having a crystallinity of at least 90%, particularly substantially about 100%, and a distance between graphite platelets of substantially 0.335 nm. In the graphite structure the π-electrons are not associated with any individual carbon atom, but are equally shared by all of the carbon atoms in the graphite layer. As a result, each graphite platelet will possess a cloud of electons above and below the platelet. This feature confers a degree of metallic character on the material and enables it to undergo chemical interactions with selected gas and vapor molecules causing such entities to be strongly held onto the graphite plane surface (chemisorbed). In contrast, activated carbon is typically amorphous (none graphitic) and thus is composed of disordered material that has no available cloud of electrons for chemical interactions. In such a case, gas and vapor molecules are held onto the surface by relatively weak physical forces (physisorbed), and thus, selected gas molecules tend to reside within the micropores of the carbon solid. In order to enhance this physical absorption process, it is necessary to maintain the temperature of such materials at a very low temperature level, typically −196° C.

Non-limiting examples of preferred carbon nanostructures are those selected from carbon nanotubes, carbon fibrils, carbon nanoshells, and carbon nanofibers. Typically, the nanostructure will be substantially graphitic, and in the case of carbon nanofibers, the most preferred nanostructure, the interstices will be the distance between graphitic platelets of about 0.335 nm. It is to be understood that the terms "carbon filaments", "carbon whiskers", "carbon nanofibers", and "carbon fibrils", are sometimes used interchangeably by those having ordinary skill in the art.

For purposes of the present invention, carbon fibrils, which themselves are sometimes referred to as carbon nanotubes, are of the type described in U.S. Pat. Nos. 4,663,230 and 5,165,909, both of which are incorporated herein by reference. Carbon fibrils are reported to be essentially cylindrical discrete structures characterized by a substantially constant diameter between about 3.5 nm and 70 nm, a length greater than about 5, preferably 100 times the diameter, an outer region of multiple essentially continuous layers of ordered carbon atoms having c-axis that are substantially perpendicular to the cylindrical axis of the fibril, and a distinct inner core region. Each of the layers and core are reported in the above patents to be disposed substantially concentrically about the cylindrical axis of the fibril. The carbon fibrils are catalytically grown by the thermal decomposition of a gaseous carbon-containing compound.

Carbon nanotubes, other than those which are sometimes also referred to as carbon fibrils, will typically be of the fullerene type. Such structures are described in an article by M. S. Dresselhaus et. al. entitled *Fullerenes*, on pages 2087–2092 in *Journal of Materials Research*, Vol 8, No. 8, August 1993, which article is incorporated herein by reference. Fullerenes are $C_n$ cage molecules built from a collection of hexagonal and pentagonal faces. The $C_{60}$ fullerenes are typically referred to as "buckminsterfullerenes" or simply "buckyballs". $C_{60}$-derived tubules can be defined, in simplest terms by bisecting a $C_{60}$ molecule at the equator and joining the two resulting hemispheres with a cylindrical tube one monolayer thick and with the same diameter as $C_{60}$. Carbon nanotubes can also be defined as substantially hollow structures comprised of substantially parallel graphite layers aligned at distances of about 0.335 nm to 0.67 nm from each other.

Carbon nanoshells, also sometimes referred to as carbon nanoparticles, are typically polyhedral layered structures comprised of multiple layers of carbon, forming substantially closed shells around voids of various shapes and sizes. Such materials are described in an article entitled "Encapsulation Of Lanthanum Carbide In Carbon Nanotubes And Carbon Nanoparticles", by Mingqui Liu and John M. Cowley; Carbon, Vol. 33, No. 2, pages 225–232; Elsevier Science Inc., 1995. For purposes of the present invention, a metal which is capable of dissociatively absorbing hydrogen, such as lanthanum and magnesium, is incorporated into the void, or hollow inner core of the carbon nanoshell.

The carbon nanofibers, which are the preferred carbon nanostructures of the present invention are produced by growing them with the use of a suitable catalyst in the presence of an effective carbon-containing compound. They are preferably grown from unsupported catalytic metal powders; although they can also be grown on a substrate onto which a catalytic metal particle precursor has been deposited. Non-limiting examples of suitable substrate materials from which the carbon nanofibers may be grown include: carbon materials, particularly carbon fibers; oxides such as alumina and silica; carbides, such as silicon carbide; nitrides, such as silicon nitride; and metallic substrates, such as a metallic wire, mesh, and screen; cellulosic material; and polymeric foam. It is preferred that the substrate be in a form selected from the group consisting of a sheet, a fiber, and a powder. If a metallic substrate is used from which the nanofibers of the present invention are grown, it is preferred that the metal not be one in which carbon can be readily dissolved. Preferred metallic substrates are those comprised of Ti, Ta, and Al. It is also within the scope of the present invention that a mixture of metal powders be used. That is, where all of the particles are catalyst particles wherein some portion of the particles are non-catalytic, such as ceramic particles. As previously mentioned, it is most preferred in the practice of the present invention that the nanofibers be grown without the use of a substrate.

Catalysts suitable for growing the carbon nanofibers of the present invention are Group VIII metals, preferably Fe and Ni-based catalysts. The catalysts are typically alloys or multi-metallics comprised of a first metal selected from the metals of Group IB of the Periodic Table of the Elements, and a second metal selected from the group consisting of Fe, Ni, Co, Zn, or mixtures thereof. Group IB metals are Cu, Ag, and Au. Preferred are Cu and Ag with Cu being the most preferred. The Group IB metals is present in an amount ranging from about 0.5 to 99 at. % (atomic %). A third metal may also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of copper in combination with Fe, Ni, or Co. More preferred is copper in combination with Fe and Ni from an economic point of view. That is, a catalyst of which Fe is used in place of some of the Ni would be less expensive than a catalyst comprised of Cu in combination with only Ni.

The shape of the nanofibers will be any suitable shape. Non-limiting examples of suitable shapes include straight, branched, twisted, spiral, helical, coiled, and ribbon-like. The most preferred shape for hydrogen storage are the branched and straight nanofibers. It is to be understood that the graphite platelets may have various orientations. For example, they can be aligned parallel, perpendicular, or at an angle with respect to the longitudinal axis of the nanofiber. Further, the surface area of the carbon nanofibers can be increased by careful activation with a suitable etching agent, such as carbon dioxide, steam, or the use of a selected catalyst, such as an alkali or alkaline-earth metal.

The structural forms of the nanofibers of the present invention can be controlled to a significant degree. For example, use of a catalyst which is comprised of only Fe will produce predominantly straight nanofibers having their graphite platelets substantially perpendicular to the longitudinal axis of the nanofibers. The distance between the platelets (the interstices) will be between about 0.335 nm and 0.67 nm, preferably from about 0.335 nm to 0.40 nm. It is most preferred that the distance be as close to 0.335 nm as possible, that is, that it be substantially 0.335 nm. The catalyst can also contain up to about 99 at. %, even up to about 70 at. %, or even up to about 50 at. %, preferably up to about 30 at. %, more preferably up to about 10 at. %, and most preferably up to about 5 wt. % copper, with the remainder being a Group VIII metal, preferably nickel or iron, more preferably iron. Catalysts having a high copper content (70 at. % to 99 at. %) will typically generate nanofibers which are predominantly helical or coiled, and which have a relatively low crystallinity (from about 5 to 25%). Lower concentrations of copper, e.g., 0.5 to 30 at. % have a tendency to produce spiral and branched nanofibers, whereas a catalyst with about 30 to 70 at. %, preferably 30 to 50 at. % copper will produce predominantly branched nanofibers.

Hydrogen can be absorbed, and to a minor degree adsorbed, into the carbon nanostructure by introducing hydrogen into a suitable vessel containing the carbon nanostructures of the present invention. Typically, the hydrogen will be introduced into a vessel containing a bed of said carbon nanostructures at a pressure which will encourage the hydrogen to be absorbed into the interstices of the nanostructure. It is within the scope of the present invention that the vessel contain the nanostructures grown from a substrate, preferably from a carbon fiber. When the nanostructures are carbon nanofibers meeting the criteria of the present invention, a hydrogen pressure is used from at least about 300 Torr to the pressure of nanostructure saturation, (possibly as high as several thousand Torr). It is preferred that at least about 350 Torr, more preferably at least about 400 Torr, and most preferably at least about 500 Torr, be used. A Torr is a unit of pressure that is equal to approximately $1.316 \times 10^{-3}$ atmosphere. The temperature at which hydrogen is absorbed into the carbon nanostructures is at any suitable temperature. Preferred are temperatures from about room temperature (22° C.) to about 400° C., preferably from about 200° C. to 400° C., more preferably from about 300° C. to 400° C. Further, hydrogen can be stored in the nanofibers at substantially room temperatures and pressures for extended periods of time, although it may be desirable to use temperatures lower than room temperature and pressures higher than atmospheric pressure. Other carbon materials, such as activated carbon, require extremely low temperatures to hold the hydrogen in the structure. As previously stated, this is primarily due to the fact that materials, such as activated carbon, do not have chemisorption properties with respect to hydrogen. It is preferred that the nanostructures of the present invention have at least 4 liters, more preferably at least about 8 liters, most preferably at least about 16 liters, even up to about 24 liters of hydrogen stored therein per gram of nanostructure material.

If a substrate is used to grow the carbon nanofibers of the present invention, conventional techniques can be used to deposit a catalyst metal precursor on the surface of the substrate. Non-limiting examples of such techniques include incipient wetness, vaporization, and electrolytic deposition if the substrate is conducting. A typical incipient wetness technique includes dissolving a suitable salt of each metal of the catalyst in an appropriate solvent, then wetting the substrate, for example, carbon fibers, with the salt solution. The wetted substrate is then dried at a temperature greater than 100° C., preferably from about 105° C. to about 120° C., and more preferably at about 110° C. After drying, they are calcined at a temperature from about 200° to 300° C., thereby converting the individual metals to their respective oxide form. The so-treated substrate is then heated, in a hydrogen containing atmosphere, at a temperature from about 400° to about 600° C., preferably from about 450° to 550° C., for an effective amount of time, to produce the catalyst in an appropriate catalytic form. By effective amount of time, we mean that amount of time needed to reduce substantially all of the metal oxides to the respective multi-metallic state having a suitable particle size. Suitable particle sizes are from about 25 Å to about 1500 Å preferably from about 50 Å to about 1000 Å, and more preferably from about 50 Å to about 200 Å. The catalyst particle size determines the diameter of the nanofiber.

Metal salts suitable for use in the present invention are salts which are soluble in water, as well as in organic solvents. Non-limiting examples of water soluble salts suitable for use herein include nitrates, sulfates and chlorides. Non-limiting examples of salts soluble in organic solvents, which are suitable for use herein include formates, acetates, and oxalates. Preferred are the organic soluble salts because the substrate, if carbon fibers, will not have to be pretreated. However, if the substrate is a ceramic oxide, nitride, or boride, water soluble salts are preferred. Non-limiting examples of organic solvents suitable for use herein include: alcohols; such as methanol, ethanol, propanol, and butanol; ketones, such as acetone; acetates and esters; and aromatics, such as benzene and toluene.

When an aqueous solution of metal salt is used, it is preferred that the surface of the substrate, if carbon fibers, be pretreated to make the surface more acceptable to the catalyst. One preferred method of pretreating the carbon fibers is to oxygenate the fiber surface using atomic oxygen, or a compound that will produce atomic oxygen in a plasma. Although an oxidizing agent, such as nitric acid, can also be used, it is not preferred because it would have a tendency to oxygenate only the defect sites of the surface instead of oxygenating substantially the entire surface as would atomic oxygen. The surface of the substrate is preferably treated with atomic oxygen for an effective amount of time, at about room temperature. By effective amount of time, we mean for that mount of time, preferably for that minimum amount of time, needed to oxygenate substantially the entire surface of the carbon fibers.

If a vaporization technique is used to deposit the catalyst precursor, volatile metal salts, such as carbonyls, or the elemental metal, are used. Vaporization can be accomplished by any appropriate technique, such as vapor deposition.

The nanofibers of the present invention are produced by reacting the catalyst in a heating zone with the vapor of a suitable carbon-containing compound for an effective amount of time. By an effective amount of time, we mean, for that amount of time needed to produce the desired nanofiber structural arrangement. This mount of time will generally be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the catalyst. Generally, this temperature will range from about 500° C. to about 700° C., and preferably from about 550° C. to about 650° C.

Carbon-containing compounds suitable for use in the practice of the present invention are compounds composed mainly of carbon atoms and hydrogen atoms, although carbon monoxide may also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating zone. By an effective amount, we mean that minimum amount of hydrogen which will maintain a clean catalyst surface(free of carbon residue), but not so much that will cause excessive hydrogasification, or burn-off, of carbon from the nanofibers and/or fiber substrate structure, if present. Generally, the amount of hydrogen present will range from about 5 to 40 vol. %, preferably from about 10 to 30 vol. %, and more preferably from about 15 to 25 vol. %. Hydrogen serves two competing functions. For example, on the one hand it acts as a cleaning agent for the catalyst, and on the other hand it hydrogasifies, or causes carbon burn-off, of the carbon structure. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. The Cu:Ni is so active that it utilizes essentially all of the carbon deposited thereon to grow nanofibers, and thus, there is generally no carbon residue to clean off After the nanofibers are grown, it may be desirable to treat the final structure with an aqueous solution of an inorganic acid, such as a mineral acid, to remove any excess catalyst particles. Non-limiting examples of mineral acids which can be used include sulfuric acid, nitric acid, and hydrochloric acid. Preferred is hydrochloric acid.

The edges of the graphite platelets may be etched with an appropriate etching agent, preferably carbon dioxide, steam, or a suitable catalyst such as an alkali or alkaline-earth metal. The nanofibers of the present invention are also suitable for the storage of other small gas molecules, such as He, $O_2$, NO, $N_2O$, $NH_3$, CO, $CO_2$, and $CH_4$, which can also be stored between the platelets.

It is also within the scope of the present invention that the nanostructures be treated so as to include minor amounts (about 1 wt. % to 5 wt. %, based on the total weight of the nanostructure) of a metal, preferably a transition metal capable of dissociatively absorbing hydrogen. Preferred transition metal dissociating agents include Pd, Pt, Ni, or alternatively a metal selected from the group consisting of Fe, Ru, Os, Co, Rh, Ir, La, and Mg—which can dissociatively absorb hydrogen.

The present invention will be illustrated in more detail with reference to the following examples, which should not be construed to be limiting in scope of the present invention.

EXAMPLE 1

A series of runs were conducted using 100 mg samples of a copper:nickel bimetallic powder (Cu:Ni ratio 3:7). Each sample was placed in a two inch diameter fused silica reactor tube at room temperature (about 22° C.) and then heated to a temperature of 350° C. in a 10% hydrogen/helium mixture at a flow rate of 100 standard cubic centimeters per minute (sccm) in a clam shell type electric furnace. These conditions were maintained for 30 minutes at which time the hydrogen flow was stopped and the sample brought to the desired reaction temperature in the presence of helium alone. Upon reaching the desired reaction temperature, the flow of helium was replaced by a flow of ethylene (100 sccm) and the reaction was allowed to proceed for 90 minutes. Following this procedure, the flow of ethylene was replaced with a flow of helium. The sample cooled to room temperature and reweighed to determine the amount of carbon produced. The weight changes of the samples are shown in Table I below.

TABLE I

Effect of Temperature on Carbon Nanofiber Formation
From Interaction of Cu:Ni(3:7) with Ethylene

| Sample | Temperature °C. | % Conv. of Ethylene to Carbon |
|---|---|---|
| a | 300 | 0 |
| b | 400 | 0 |
| c | 450 | 0 |
| d | 500 | 19 |
| e | 550 | 57 |
| f | 600 | 66 |
| g | 650 | 68 |
| h | 700 | 69 |
| i | 720 | 0 |
| j | 750 | 0 |

Subsequent examination of the carbon deposits in a scanning electron microscope showed that the carbon consisted entirely of filamentous, or nanofiber form.

EXAMPLE 2

The experimental procedure of Example 1 was followed except that the composition of the copper:nickel bimetallic powders was varied from 80:20 to 0:100 with the reaction temperature maintained at 650° C. The weight changes due to carbon formation on the bimetallic powders are shown in Table II below.

TABLE II

Effect of Catalyst Composition on the Production of
Carbon Nanofibers

| Catalyst Composition Cu:Ni Ratio | % Conversion of Ethylene to Carbon |
|---|---|
| 80:20 | 9.8 |
| 70:30 | 59.6 |
| 50:50 | 71.0 |
| 30:70 | 69.2 |
| 20:80 | 63.7 |
| 10:90 | 54.3 |
| 0:100 | 31.1 |

EXAMPLE 3

The experimental procedure used in Example 1 was followed in all, except the reaction time was varied from 0.5 to 8 hours and the reaction temperature was maintained at 600° C. The weight changes due to carbon formation on the bimetallic powders are shown in Table III below.

TABLE III

Effect of Reaction Time on Carbon Nanofiber Yield

| Reaction Time (Hrs.) | % Conversion of Ethylene to Carbon |
|---|---|
| 0.5 | 59.5 |
| 1.0 | 67.3 |
| 1.5 | 66.0 |
| 2.0 | 62.4 |
| 3.0 | 58.7 |

TABLE III-continued

Effect of Reaction Time on Carbon Nanofiber Yield

| Reaction Time (Hrs.) | % Conversion of Ethylene to Carbon |
|---|---|
| 4.0 | 56.9 |
| 5.0 | 57.8 |
| 6.0 | 56.1 |
| 8.0 | 50.2 |

EXAMPLE 4

In a series of comparative experiments, 100 mg of iron and nickel and various bimetallic of these metals were placed in the reactor system described in Example 1, then initially heated in a 10% hydrogen/helium mixture (100 sccm) at 350° C. for 30 minutes. Following this treatment the samples were brought to a temperature of 600° C. in helium. The helium was replaced with a flow of ethylene/hydrogen environment where the ratio of hydrocarbon/hydrogen was systematically varied from 100/0 to 10/90 for a constant reaction of 1.5 hours. The data obtained from these experiments is presented in Table IV below.

TABLE IV

% Carbon Nanofiber Yield From Various Catalysts
As a Function of Ethylene/Hydrogen Ratio

| Catalyst | 100:0 | 4:1 | 2:1 | 1:1 | 1:2 | 1:4 | 1:9 |
|---|---|---|---|---|---|---|---|
| Nickel | 0 | 1.7 | 7.4 | 44.2 | 32.8 | 31.6 | — |
| Copper-Nickel (3:7) | 74.3 | 66.5 | 65.5 | 57.9 | 42.3 | 26.8 | 17.1 |
| Copper-Nickel (1:1) | 69.6 | — | — | 62.7 | 53.2 | 26.8 | — |
| Iron | 0 | 0.2 | 0.5 | 1.0 | 1.5 | 2.0 | — |
| Copper-Iron (3:7) | 0 | 3.3 | 6.4 | 60.7 | 52.8 | 27.1 | — |
| Silver-Iron (3:7) | 1.0 | 39.0 | — | 40.3 | — | 51.9 | — |
| Nickel-Iron (8:2) | 62.3 | 67.3 | — | 70.8 | — | 66.1 | — |
| Nickel-Iron (1:1) | 1.0 | 4.0 | — | 16.9 | — | 50.2 | 51.2 |
| Nickel-Iron-Copper (7:12:1) | 64.1 | 63.4 | 68.4 | 68.6 | 65.7 | 63.3 | 44.6 |

EXAMPLE 5

In another series of experiments 5 wt. % of a catalyst, consisting of various ratios of copper and nickel were deposited onto carbon fibers (T-300). This carbon fiber supported catalyst system was initially calcined in air at 300° C. for 0.5 hours and then reduced in hydrogen at 300° C. for 1 hour. Following this treatment the supported catalyst was reacted in the apparatus described in Example 1 in an ethylene/hydrogen (1:1) mixture at 600° C. for 2.0 hours. After reaction the samples were cooled to room temperature in helium and the yield of carbon nanofibers formed on the parent fibers was determined by weight difference, and the values recorded in Table V below.

TABLE V

Effect of Catalyst Composition on the Production
of Carbon Nanofibers on Carbon Fibers

| Catalyst Composition Cu:Ni Ratio | Grams of Carbon Deposited |
|---|---|
| 80:20 | 0.017 |
| 50:50 | 0.225 |
| 20:80 | 0.460 |

TABLE V-continued

Effect of Catalyst Composition on the Production of Carbon Nanofibers on Carbon Fibers

| Catalyst Composition Cu:Ni Ratio | Grams of Carbon Deposited |
| --- | --- |
| 10:90 | 0.502 |
| 0:100 | 0.355 |

EXAMPLE 6

Substantially straight carbon nanofibers was produced from the interaction of iron with a reactant comprising a mixture of carbon monoxide, ethylene, and hydrogen at a temperature between 500° and 1100° C. Optimum yields of nanofibers were found at 600° C. from a gas mixture of the composition ethylene, carbon monoxide, and hydrogen (3:1:1). It was found from high resolution transmission electron microscopy studies that when the catalyst was in the form of unsupported iron powder, the nanofiber structures produced had a stacking arrangement in which the graphite platelets were oriented substantially perpendicular to the longitudinal axis of the nanofibers. The measured spacing between the graphite platelets was 0.335 nm. When the iron catalyst was dispersed on a suitable support medium, such as graphite, silica, or γ-alumina, the structure of the nanofibers was one in which the graphite platelets were aligned in a direction substantially parallel to the axis of the filament. Thus, unsupported nanofibers are preferred for producing the most preferred carbon nanostructure of the present invention.

Table VI below shows the effect of gas composition on the yield of straight carbon nanofibers from the interaction of $C_2H_4$—CO—$H_2$ with unsupported iron powder at 600° C. and 60 minutes. This table also shows the importance of using carbon monoxide in the gas mixture for producing carbon nanofibers from an Fe catalyst.

TABLE VI

| $C_2H_4$—CO—$H_2$ Molar Ratio | % Carbon Nanofiber Yield |
| --- | --- |
| 80:0:20 | 0.51 |
| 73:7:20 | 20.3 |
| 68:12:20 | 50.3 |
| 60:20:20 | 68.1 |
| 38:42:20 | 67.9 |
| 17:63:20 | 45.9 |
| 0:80:20 | 21.9 |

COMPARATIVE EXAMPLE A AND EXAMPLE 7

0.397 g. of activated carbon (Norit F) and 0.075 g. of carbon nanofibers (90%–100% crystallinity and 0.335 nm to 0.40 nm distance between graphite platelets) were each separately heated from room temperature (22° C.) to 925° C. in $N_2$, then allowed to cool to room temperature. The carbon nanofibers were grown from an unsupported Cu:Ni (3:7) bimetallic catalyst powder with ethylene and hydrogen at a ratio of 4 to 1 at 600° C. The nanofibers were characterized as having a crystallinity in excess of 90%. The active carbon had less than 5% crystallinity. Each sample was run separately by placing it into the Pyrex U-tube sample chamber in a Coulter Omnisorb 100CX Unit and evacuated at room temperature, then purged in He at 150 ° C. to remove any sorbed gas species from the sample. The sample was then brought to a temperature of −196° C. The system was then sequentially dosed with increasing amounts of hydrogen and the pressure was allowed to reach equilibrium at each step in the sequence. This procedure was continued up to a maximum of 220 Torr. This represents the absorption part of the procedure. When the maximum pressure was reached, the desorption part of the procedure was commenced wherein the pressure of the system was sequentially reduced by evacuation until a pressure of 0 Torr was reached. The volume of hydrogen that was sorbed and desorbed during this procedure was measured as a function of pressure and was plotted in the form of sorption and desorption isotherms which are presented as FIGS. IA and IB hereof.

The difference between the sorption (adsorption/absorption) and desorption isotherms represents the amount of irreversibly held (stored) hydrogen. For activated carbon (FIG. IA) the amount of hydrogen stored is almost negligible whereas for the carbon nanofibers of the present invention (FIG. IB) it is apparent that a significant amount of hydrogen remains absorbed (stored) in the nanostructure following evacuation to 0 pressure at −196° C. The hydrogen is readily released by heating to a temperature in excess of 100° C.

COMPARATIVE EXAMPLE B AND EXAMPLE 8

Figure 2A:
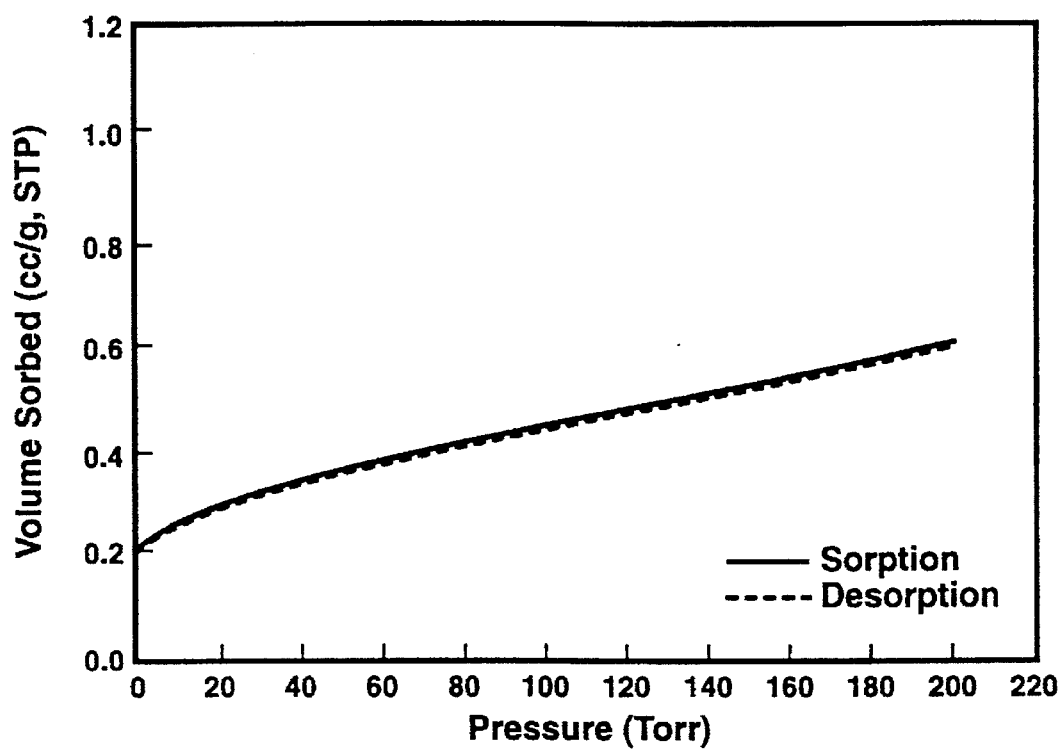
FIGS. 2A and 2B are isotherms showing the sorption and desorption behavior of active carbon and carbon nanofibers of the present invention respectively after exposure to hydrogen at 22° C.
Figure 2B:
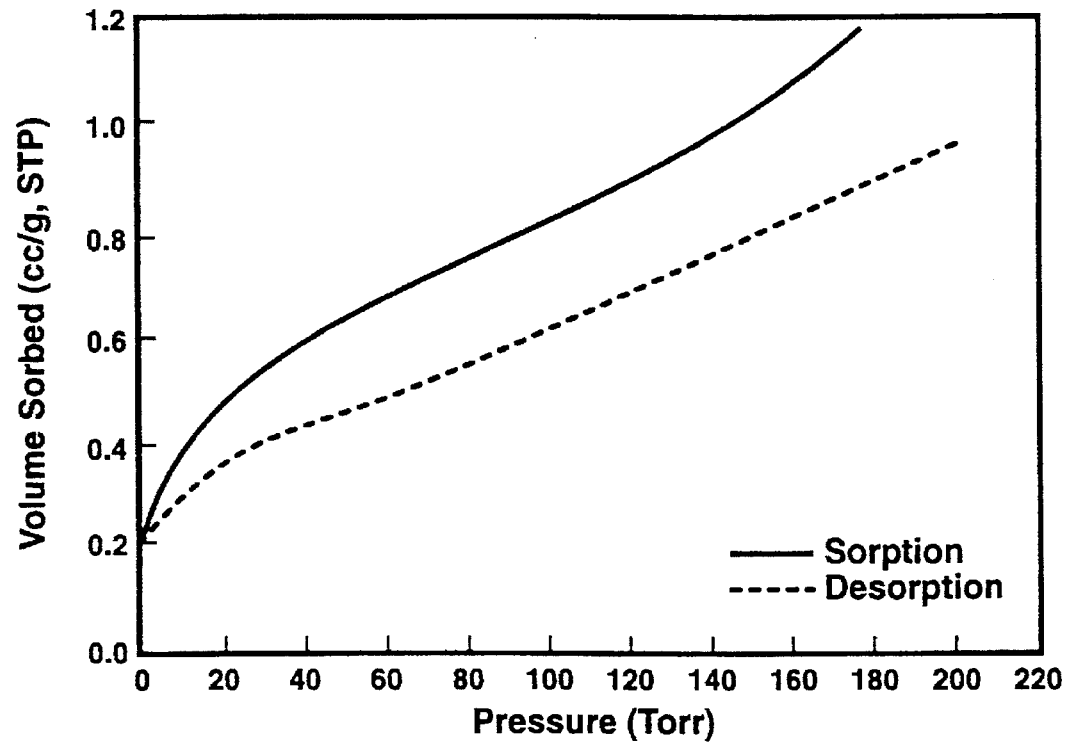

The above procedure was followed except 0.235 g. of active carbon and 0.178 g. of carbon nanofiber was used and the temperature at which the isotherms were generated was 22° C. The resulting data was again plotted and is shown in FIGS. 2a and 2b hereof. For active carbon (FIG. IIA) the amount of hydrogen that remains absorbed is almost negligible whereas for the carbon nanofibers of the present invention (FIG. IIB) it is apparent that a significant amount of hydrogen remains absorbed in the nanostructure, following evacuation to 0 Torr pressure at 22° C.

COMPARATIVE EXAMPLE C AND EXAMPLE 9

The above procedure was followed except 0.077 g of active carbon and 0.08 g. of carbon nanofiber was used and the temperature at which the isotherms were generated was 400° C. The resulting data was again plotted and is shown in FIGS. IIIA and IIIB hereof. For active carbon (FIG. 3a) the mount of hydrogen that remained absorbed was almost negligible, whereas for the carbon nanofibers of the present invention (FIG. IIIB) it is apparent that a significant mount of hydrogen remains absorbed in the nanostructure following evacuation to 0 pressure at 400° C.

What is claimed is:

1. A composition comprised of:
   (a) a solid layered nanostructure comprised of: (i) crystalline regions; (ii) interstices within said crystalline regions which interstices are from about 0.335 nm to 0.67 nm, and (iii) surfaces of said nanostructure which define said interstices, which surfaces have chemisorption properties with respect to hydrogen; and
   (b) hydrogen stored within said interstices.

2. The composition of claim 1 which has a crystallinity of at least 5%.

3. The composition of claim 2 wherein the nanostructure is a carbon nanostructure.

4. The composition of claim 3 wherein the carbon nanostructure is selected from the group consisting of carbon nanotubes, carbon fibrils, carbon nanoshells, and carbon nanofibers.

5. The composition of claim 4 wherein the carbon nanostructure is a carbon fibril characterized by a substantially constant diameter between about 3.5 nm and 70 nm, a length greater than about 5 times the diameter, an outer region of multiple essentially continuous layers of ordered carbon atoms having c-axis that are substantially perpendicular to the cylindrical axis of the fibril, and a distinct inner core region.

6. The composition of claim 5 wherein the carbon fibrils are substantially cylindrical.

7. The composition of claim 6 wherein the carbon fibrils are further characterized as having: (i) a surface area from about 0.2 to 3,000 $m^2/g$ as determined by $N_2$ adsorption at $-196°$ C., and (ii) a crystallinity from about 50% to 100%.

8. The composition of claim 7 wherein the crystallinity is from about 90% to 100%.

9. The composition of claim 8 wherein the surface area is from about 50 to 800 $m^2/g$ and the interstices of about 0.335 nm to about 0.40 nm.

10. The composition of claim 4 wherein the carbon nanostructure is a carbon nanotube characterized as having: (i) a surface area from about 0.2 to 3,000 $m^2/g$ as determined by $N_2$ adsorption at $-196°$ C., and (ii) a crystallinity from about 50% to 100%.

11. The composition of claim 10 which also contains at least one metal capable of dissociatively absorbing hydrogen.

12. The composition of claim 11 wherein the metal is selected from the group consisting of Pd, Pt, Ni, La, and Mg.

13. The composition of claim 4 wherein the carbon nanostructure is a carbon nanoshell characterized as being a polyhedral layered structure comprised of multiple layers of carbon, forming substantially closed shells around voids of various shapes and sizes.

14. The composition of claim 13 which also contains at least one metal capable of dissociatively absorbing hydrogen.

15. The composition of claim 14 wherein the metal is selected from the group consisting of Pd, Pt, Ni, La, and Mg.

16. A composition comprised of:

(a) a carbon nanofiber comprised of: (i) a crystallinity of at least about 50%; (ii) interstices within said crystalline regions which interstices are from about 0.335 nm to 0.67 nm, and (iii) surfaces of said nanofiber which define said interstices, which surfaces have chemisorption properties with respect to hydrogen; and (b) hydrogen stored within said interstices.

17. The composition of claim 16 wherein the carbon nanofibers are further characterized as having: (i) a surface area from about 0.2 to 3,000 $m^2/g$ as determined by $N_2$ adsorption at $-196°$ C., (ii) a crystallinity from about 75% to 100%, and (iii) interstices of about 0.335 nm to 0.67 nm.

18. The composition of claim 17 wherein the crystallinity is from about 90% to 100%.

19. The composition of claim 18 wherein the surface area is from about 50 to 800 $m^2/g$ and the interstices of about 0.335 nm to about 0.40 nm.

20. The composition of claim 19 which also contains at least one metal capable of dissociatively absorbing hydrogen.

21. The composition of claim 20 wherein the metal is selected from the group consisting of Pd, Pt, Ni, La, and Mg.

22. The composition of claim 19 wherein the interstices are substantially 0.335 nm.

23. A hydrogen storage device comprising:

(a) a vessel;

(b) a hydrogen storage bed disposed in said vessel, wherein the hydrogen storage bed in comprised of a solid layered nanostructure comprised of: (i) crystalline regions; (ii) interstices within said crystalline regions which interstices are from about 0.335 nm to 0.67 nm, and (iii) surfaces of said nanostructure which define said interstices, which surfaces have chemisorption properties with respect to hydrogen.

24. The storage system of claim 23 wherein the nanostructure has a crystallinity of at least 50%.

25. The storage system of claim 24 wherein the layered nanostructure is a carbon nanostructure.

26. The storage system of claim 25 wherein the carbon nanostructure is selected from the group consisting of carbon nanotubes, carbon fibrils, and carbon nanofibers.

27. The storage system of claim 26 wherein the carbon nanostructure is a carbon fibril characterized by a substantially constant diameter between about 3.5 nm and 70 nm, a length greater than about 5 times the diameter, an outer region of multiple essentially continuous layers of ordered carbon atoms having c-axis that are substantially perpendicular to the cylindrical axis of the fibril, and a distinct inner core region.

28. The storage system of claim 27 wherein the carbon fibrils are substantially cylindrical.

29. The storage system of claim 27 wherein the crystallinity is from about 90% to 100%.

30. The storage system of claim 26 wherein the carbon nanostructure is carbon nanofibers the characterized as having: (i) a surface area from about 0.2 to 3,000 $m^2/g$ as determined by $N_2$ adsorption at $-196°$ C., and (ii) a crystallinity from about 50% to 100%.

31. The storage system of claim 30 wherein the surface area is from about 50 to 800 $m^2/g$; and the interstices are from about 0.335 nm to 0.40 nm.

32. The storage system of claim 31 wherein the crystallinity is from about 90% to 100%.

33. The storage system of claim 32 wherein the surface area is from about 250 to 350 $m^2/g$.

34. The storage system of claim 33 which also contains at least one metal capable of dissociatively absorbing hydrogen.

35. The storage system of claim 34 wherein the metal is selected from the group consisting of Pd, Pt, Ni, La, and Mg.

36. The storage system of claim 30 wherein the carbon nanofibers are attached to carbon fibers on which said nanofibers were grown.

37. A process for storing hydrogen, which process comprises: (i) providing a vessel containing carbon nanostructures, which nanostructures have a crystallinity of at least about 50%; interstices within said crystalline regions which interstices are from about 0.335 nm to 0.67 nm, and surfaces of said nanofiber which define said interstices, which surfaces have chemisorption properties with respect to hydrogen; and (ii) introducing hydrogen into said vessel at a pressure of at least about 300 Torr.

38. The process of claim 37 wherein the carbon nanostructure is selected from the group consisting of carbon nanotubes, carbon fibrils, carbon nanoshells, and carbon nanofibers.

39. The process of claim 38 wherein the carbon nanostructure is characterized as having: (i) a surface area from about 0.2 to 3,000 $m^2/g$ as determined by $N_2$ adsorption at $-196°$ C., (ii) a crystallinity from about 5% to 100%, and (iii) interstices of about 0.335 nm to 0.67 nm.

40. The process of claim 39 wherein the carbon nanostructures are carbon nanofibers characterized as having: (i) a surface area from about 50 to 800 $m^2/g$; (ii) a crystallinity from about 50% to 100%; and (iii) interstices of about 0.335 nm to about 0.67 nm.

41. The process of claim 34 wherein the interstices are about 0.335 nm.

* * * * *